Dec. 18, 1923.
J. DEENIHAN
1,477,631
ELECTRICALLY HEATED ICE CUTTER
Filed Nov. 3, 1922
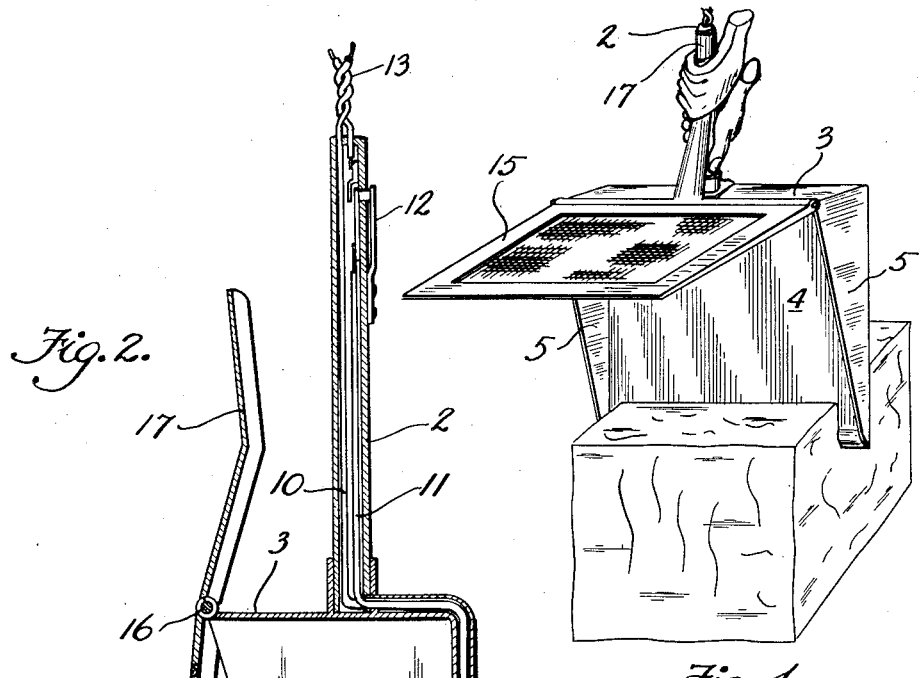
Fig. 1.
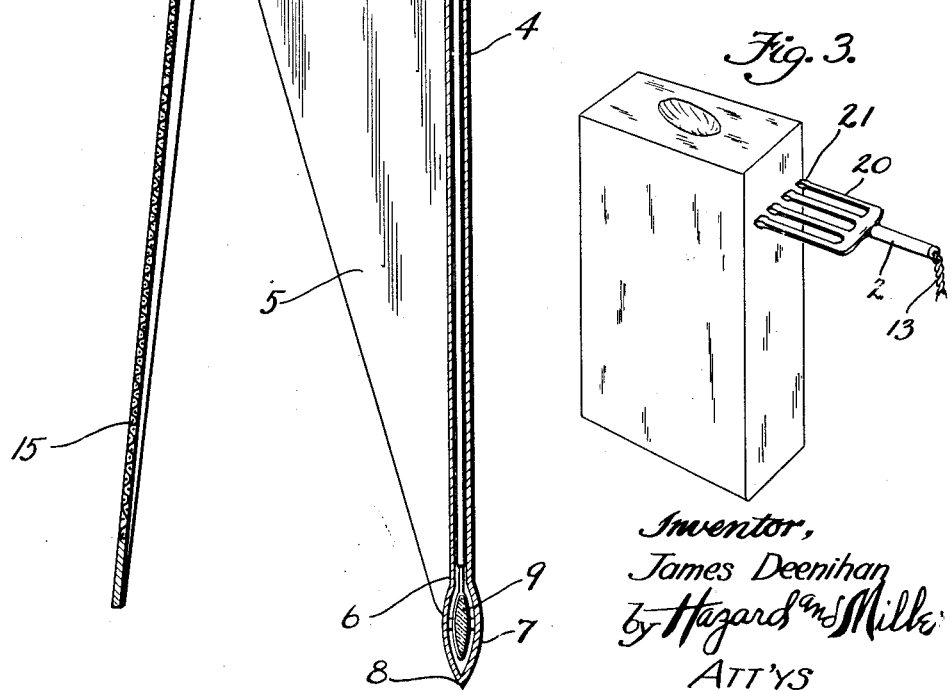
Fig. 2.
Fig. 3.
Inventor,
James Deenihan
by Hazard and Miller
ATT'YS Patented Dec. 18, 1923.

1,477,631

UNITED STATES PATENT OFFICE.

JAMES DEENIHAN, OF REDONDO BEACH, CALIFORNIA.

ELECTRICALLY-HEATED ICE CUTTER.

Application filed November 3, 1922. Serial No. 598,765.

*To all whom it may concern:*

Be it known that I, JAMES DEENIHAN, a citizen of the United States, residing at Redondo Beach, in the county of Los Angeles and State of California, have invented new and useful Improvements in Electrically-Heated Ice Cutters, of which the following is a specification.

This invention relates to ice cutting means and has for an object to provide a simple electrically heated means for severing a block of ice.

Other objects and advantages will be made manifest in the following specification of an embodiment of the invention disclosed in the accompanying drawing, wherein:

Figure 1 is a perspective showing the cutter applied.

Fig. 2 is a central, longitudinal section of the cutter.

Fig. 3 is a perspective showing a modified form of the cutter.

The device comprises a tubular handle 2 one end of which is connected to the end wall 3 of a tray-like body having a bottom 4 and side walls 5. Along the transverse edge or end 6 of the bottom 4 there is provided a flat tube 7 preferably having a knife-like edge 8.

Within the entering part 7 there is arranged a heating unit or coil 9 from the ends of which extend in and along the bottom 4 electric wires 10 and 11 which may lead to, and be connected with, any suitable switch or circuit closing element 12 which, for convenience, is shown as mounted on the upper end of the handle 2.

The electric wires 10 and 11 extend from the handle in the form of an extension cord 13 to be attached to any source of current.

In operation the cutting edge 8 of the pan is applied as in Figure 1 to a block of ice and pressure on the switch 12 in the handle 2 will close the electric circuit of the heating unit 9 and this will become sufficiently heated to heat the cutting end of the pan and this will cause the ice to be melted and the block cut.

Preferably a cover 15 is hinged at 16 so as to spring down in closing position over the ice in the pan and the upper end of the cover is provided with a handle 17 which, when engaged in the hand, can be drawn toward the handle 2 so as to hold the cover 15 in open position while cutting.

In Figure 3 a slightly modified form of the device is shown in which the handle is provided with a series of prongs 20 in the ends of which are heating units indicated at 21.

Further embodiments, modifications and changes may be resorted to within the spirit of the invention as here claimed.

What is claimed is:

1. An ice cutter comprising a pan having an entering edge adapted to penetrate a block of ice and an electrically energized heating element enclosed in said edge.

2. An ice cutter comprising a pan having an entering edge, and an electrically heated unit enclosed in said edge, the pan having a handle provided with a current controlling device.

3. A combined ice cutter and pan having an entering edge provided with an enclosed electrical heating unit, a handle at one end of the pan, a cover hinged on the pan and provided with a handle part disposed contiguous to said handle, and a circuit closing switch in said handle.

4. An ice cutter comprising a handle part and an ice penetrating part, and an electrically energized heating element enclosed within the penetrating part, whereby the user is protected from electric shock by the energizing current.

In testimony whereof I have signed my name to this specification.

JAMES DEENIHAN.